United States Patent Office 3,833,529
Patented Sept. 3, 1974

3,833,529
WATER-SOLUBLE ALKYD RESINS AND A
PROCESS FOR THEIR PREPARATION
Kenneth H. Albers, Alden E. Blood, and Thomas C.
Snapp, Jr., Longview, Tex., assignors to Eastman Kodak
Company, Rochester, N.Y.
No Drawing. Continuation-in-part of application Ser. No.
151,952, June 10, 1971, now Patent No. 3,709,858,
which is a continuation-in-part of application Ser. No.
41,577, May 28, 1970, now Patent No. 3,652,501.
This application Mar. 24, 1972, Ser. No. 237,901
The portion of the term of the patent subsequent to
Mar. 28, 1989, has been disclaimed
Int. Cl. C08g 20/30, 41/00
U.S. Cl. 260—29.2 N
26 Claims

ABSTRACT OF THE DISCLOSURE

A curable, water-soluble alkyd resin which is useful in an improved protective coating composition is a polyesteramide of at least one polycarboxylic acid and a polyol component; the polyol component comprising a substantial amount of N,N-bis[2-hydroxyalkyl]-2-hydroxyethoxyacetamide, at least one additional polyhydric aliphatic or cycloaliphatic alcohol, and a diol-acid, e.g., 2,2-bis(hydroxymethyl)propionic acid.

This application is a continuation-in-part of U.S. patent application Ser. No. 151,952, filed June 10, 1971, now Pat. No. 3,709,858, which in turn is a continuation-in-part of U.S. patent application Ser. No. 41,577, filed May 28, 1970, now Pat. No. 3,652,501.

This invention relates to novel alkyd resins that contain the trioletheramides, N,N-bis[2-hydroxyalkyl]-2-hydroxyethoxyacetamide. More particularly, the invention is concerned with the preparation of curable, water-soluble polyesteramides of the aforementioned trioletheramide, a polyhydric aliphatic or cycloaliphatic alcohol, a diol-acid, and a polycarboxylic acid(s) or anhydride(s) useful in the preparation of protective coating compositions having improved impact-resistance and hardness. The term "water-soluble" as used in the specification and claims means that the alkyd resins are soluble in water in a broad ratio of, for example, from about 1:0.5 to 1:6.0. If necessary, from about 1 to about 50 weight percent, and preferably from about 25 to about 40 weight percent, of an organic coupler or cosolvent may be added to the water to assist the solubility of the resin. Preferably, this coupler is an alcohol or glycol of from 2 to 15 carbons although other organic or inorganic solvent agents may be used.

Alkyd resins comprising residues of polyhydroxy compounds, such as glycerine, trimethylolpropane, and pentaerythritol and polycarboxylic acids in the polymeric chain have heretofore been utilized to provide surace coating compositions such as paint; see U.S. Pat. No. 3,213,063. Other alkyd resins such as certain polyesteramides are also known from the prior art as exemplified by U.S. Pats. Nos. 3,447,916; 2,644,733; 2,831,813; 2,944,-025; 3,341,573; 3,083,188; French Pat. No. 1,542,811; Canadian Pat. No. 812,738; Belgian Pat. No. 732,008 and Japanese Pat. No. 16,911/69. Many of these polyesteramides, however, are oil-soluble materials and are used as additives for petroleum products. Certain of these various types of alkyd resins do not provide satisfactory protective coating compositions unless subjected to a separate hot air dry curing operation. Moreover, many of these alkyd resins when used in protective coating compositions require the use of expensive polycarboxylic acid compounds if the resultant alkyd resin used in the protective coating composition is to be water-soluble. In addition, protective coating compositions prepared from certain of these prior art alkyd resins are less impact-resistant and less hard than is desired in many cases.

None of the prior art alkyd resins, such as those noted above, contain the residue of the trioletheramides, N,N-bis[2-hydroxyalkyl] - 2 - hydroxyethoxyaectamide. These particular trioletheramides have unexpectedly been found to possess a high degree of water solubility. A description of these novel trioletheramides may be found in copending U.S. patent application Ser. No. 41,576, filed May 28, 1970, which is hereby incorporated in the present application by reference thereto.

It is an object of the present invention to provide a polyesteramide having the residue of the aforementioned trioletheramides in the polymeric chain.

Another object of the invention is to provide polyesteramides capable of being used as protective coating compositions for metallic and other types of substrates.

A further object of the invention is to provide water-soluble, curable polyesteramides capable of being utilized in a protective coating composition which, when coated onto metallic substrates and baked, cure to form protective surface coatings exhibiting improved hardness and impact resistance in addition to other desirable properties such as solvent and weather resistance, flexibility and gloss.

It is a further object of the present invention to provide improved water-soluble protective coating compositions which possess such useful properties.

It is still another object of the present invention to provide new water-soluble, curable polyesteramide resins capable of being used in protective coating compositions.

Another object of the present invention is to provide polyesteramide resins suitable for use in protective coating compositions which are curable without a separate hot air drying operation prior to baking the protective coating compositions on a substrate.

These and other objects of the present invention will become apparent from the following description.

According to the present invention there is provided a curable, water-soluble polyesteramide of (A) a polycarboxylic acid component, and (B) a polyol component comprising (1) a triol portion comprising a triolether-amide having the formula:

I.
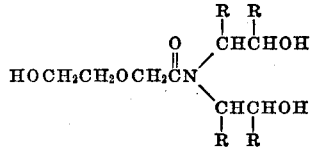

wherein each R is a member selected from the group consisting of hydrogen, methyl and ethyl, and (2) a diol-acid portion comprising a compound having the formula:

II.
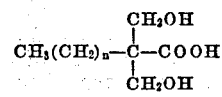

wherein $n$ is a positive integer of 0 to 5, with the proviso that the ratio of total hydroxyl groups to total carboxyl groups of the reactant components is within the range of about 1.0:1 to about 1.6:1, preferably 1.2:1 to 1.4:1, and that the components through an oxy-carbonyl linkage form integral recurring ester units of the polyesteramide molecular chain. If the ratio of hydroxyl groups to carboxyl groups is less than 1:1, an undesirable tacky film is formed rather than a resin while if the ratio exceeds 1.6:1 it becomes extremely difficult to build a resin having the desired molecular weight.

The term "polycarboxylic acid component" is meant to include both aliphatic and aromatic polycarboxylic acid and anhydride compounds (or mixtures thereof) having 4 to 20 carbon atoms and at least two carboxyl groups.

The triol portion of the polyol component may be made up of the trioletheramide compound of Formula I alone or it may be a combination of the trioletheramide blended with at least one other triol such as glycerol, trimethylolethane, trimethylolpropane or the like. Where a blend is used the percent of the trioletheramide to other triol(s) may vary within the range of from 100 to about 25 weight percent. At levels below 25 percent trioletherthe preferred range being from about 100 to about 50 weight percent. At levels below 25 perecnt trioletheramide, certain properties such as Tide resistance, impact resistance, etc. are appreciably decreased.

The diol-acid portion of the polyol component comprises, in addition to the compound of Formula II shown hereinabove, a polyhydric aliphatic and/or cycloaliphatic alcohol having 2 to 10 carbon atoms such as, for example, neopentyl glycol or 1,4-cyclohexanedimethanol. The percent of diol-acid to aliphatic and/or cycloaliphatic alcohol may vary within the range of from about 15 to about 50 weight percent of the total amount of the diol-acid portion with the preferred range being from about 25 to about 40 weight percent.

The percent of the triol portion to diol-acid portion may vary within the range of from about 75 to about 30 weight percent of the total amount of the polyol component.

In a further aspect of the present invention there is provided a water-soluble protective coating composition comprising in admixture about 1 to about 70 weight percent, and preferably about 10 to about 50 weight percent, of the above-described polyesteramides, a neutralization compound, water, and if necessary or desirable, from about 1 to about 50 weight percent (and preferably from about 25 to about 40 weight percent) of an organic or inorganic coupler or co-solvent such as, as for example, an alcohol or glycol which promotes the solubility of the alkyd resin in water.

The novel polyesteramides of the present invention are of a particular value because they can be converted to a crosslinked, insoluble form, as, for example, in a baked protective coating composition, without the use of a separate curing operation, such as air drying, before baking the protective coating composition. Moreover, the use of the diol-acids such as, for example, 2,2-bis(hydroxymethyl)propionic acid, 2,2-bis(hydroxymethyl)butyric acid, and the like, in combination with the trioletheramide and other reactants of this invention gives resins which can be completely dissolved in water without the use of organic couplers. Water solubility of the resins and resin systems of the present invention are obtained upon neutralization over a pH range of 6–9. The water-soluble resins can be formed by suitable means into an enamel coating which has vastly superior gloss and impact resistance properties when compared to commercially available solvent based coatings. In addition, water based enamels made from these novel resins have a shelf life of approximately two months versus two weeks for similar resins made without the diol-acid reactant.

The novel polyesteramide resins of the present invention may vary in properties depending upon the particular amount and types of materials comprised by the polyol component and the polycarboxylic acid component. For example, the water-solubility of the polyesteramide may vary depending upon the amount of the trioletheramide residue contained in the polymeric molecular chain. In addition, other properties of the alkyd resin such as glossiness, hardness and impact-resistance will vary to some extent depending upon the additional types of polyol compounds utilized as part of the diol-acid portion. For example, neopentyl glycol and 1,4-cyclohexanedimethanol in combination with the diol-acid 2,2-bis(hydroxymethyl)propionic acid provide an alkyd resin with excellent gloss, hardness and impact-resistance.

The polycarboxylic acid or acids comprising the polycarboxylic acid component of the instant polyesteramide resin may be selected from those acids or anhydrides having from about 4 to about 20 carbon atoms and selected from the group consisting of aliphatic (by aliphatic is meant alkyl and alkenyl) and aromatic acids and anhydrides having at least 2 carboxyl groups. Preferably, the polycarboxylic acid is a dicarboxylic acid or anhydride having from 4 to about 12 carbon atoms. Examples of these preferred acids include diglycolic, maleic, succinic, glutaric, adipic, suberic, sebacic, phthalic, isophthalic, terephthalic, mixtures of the foregoing compounds and the like. Examples of the preferred anhydrides include anhydrides of diglycolic, maleic, succinic, glutaric and phthalic acid and mixtures of these compounds. Tri- and tetrafunctional carboxylic acid compounds such as trimellitic anhydride, benzophenone tetracarboxylic acid, etc. may also be used; however, these tri- and tetrafunctional acids are more expensive and unnecessary, hence not preferred. Especially suitable polycarboxylic acids are isophthalic and adipic acid, as well as phthalic anhydride and mixtures of the same.

The polyols, or polyhydric alcohols, as they are often called, which may be used in the polyol component of the polyesteramide of the present invention to complement the novel trioletheramide described hereinabove, are aliphatic glycols, including cycloaliphatic glycols, containing at least 2 carbon atoms, preferably up to 10 carbon atoms. Suitable straight chain aliphatic glycols include polymethylene glycols such as ethylene, propylene, dipropylen, tripropylene, hexamethylene, diethylene, triethylene, butylene, heptylene, neopentyl, hydroxypivalyl hydroxypivalate, etc. Glycols containing 1 or 2 secondary hydroxyl groups can also be used such as 1,2-propylene glycol; 2,3-hexanediol; 2,3-butanediol; 2,2,4-trimethylpentane-1,3-diol and the like. Among the cycloaliphatic glycols that may be used are cycloalkane glycols such as 1,2-cyclohexanedimethanol; 1,2-dihydroxy cyclohexane; 1,3-cyclohexanedimethanol; 1,4-cyclohexanedimethanol; and the like. Preferred glycols are the alkyl and cycloalkyl glycols. Especially useful glycols are propylene glycol, neopentyl glycol and 1,4-cyclohexanedimethanol. Use of mixtures of any two or more of these glycols is also contemplated by the present invention.

Preparation of the polyesteramides of the invention can be effected by condensing the polyhydric alcohol component and the polycarboxylic acid component by, for example, the fusion cook or the solvent cook technique using an azeotropic solvent such, as for example, toluene, to remove the water of reaction. All reactants may be mixed together and heated in a single stage reaction although when certain reactants such as, for example, isophthalic acid, is one of the major reactants a hazy or cloudy resin may be produced. To avoid the production of such a hazy or cloudy resin, the reaction must be carried out in two stages. Although polyester catalysts such as lead oxide, zinc acetate, antimony oxide and the like may be utilized in amounts of about 0.05 to about 5.0 weight percent based on the weight of the reaction mixture excluding any azeotropic media such as toluene, if used, it is preferred that the reaction be carried out without catalyst. It has been discovered that this particular reaction is preferably continued until the polyesteramide reaction product has an acid number of from between about 30 to about 100 which generally means reaction time will vary from about 1 to about 12 hours or longer. In addition, it has been discovered that the temperature for carrying out this particular reaction process varies from about 110° C. to about 260° C. The preferred reaction temperature is within the range of about 120° C. to about 220° C.

The polyesteramide resin prepared as described above can be stripped of solvent, if any is used. Having thus obtained the resin in a viscous liquid form, the protective surface coating composition of the present invention may then be prepared as follows: the polyesteramide resin and an aqueous medium containing a neutralization compound (or volatile base as it is sometimes called) such as, for example, ammonia or preferably N,N-dimethylethanolamine are mixed together. The polyesteramide may be in a liquid form when admixed with the basic aqueous medium preferably at a temperature within the range of 60° C. to 80° C. The basic aqueous medium dissolves the polyesteramide resin and neutralizes free acid groups of the resin. As a result, there is obtained a clear resin solution with a pH generally from about 6 to about 9, although resin solutions with slightly lower pH's may also be obtained. If necessary or desirable, some of the water in the aqueous media in which the polyesteramide is dissolved may be replaced with from about 1 to about 50 weight percent (preferably from about 25 to about 40 weight percent) of an organic coupler or co-solvent for the alkyd resin. Preferably this coupler is an alcohol such as ethanol, tertiary or normal butanol, an ether alcohol or an ether alcohol ester such as the monobutyl ether of ethyene glycol or the like, since the polyesteramide of the present invention is alcohol-soluble as well as water-soluble. This clear resin solution provides an excellent surface composition for metallic and other substrates. In addition to modifying the aqueous medium of the surface coating composition by partial substitution of alcohols as noted above, the surface coating composition may also be modified by the addition of certain pigments such as, for example, $TiO_2$ and the resulting mixtures may be used as an enamel paint for metal substrates. Advantageously, a surface coating composition according to the present invention contains about 1 to 70 weight percent polyesteramide, about 0 to 50 weight percent of a coupling solvent, about 20 to 70 weight percent water and about 1 to 4 weight percent of a neutralization compound. Preferably, the coating composition contains about 40 weight percent polyesteramide, 15 weight percent coupling solvent, 42 weight percent water with the remainder being a neutralization compound.

The polyesteramide protective coating composition of the present invention may be coated on a variety of substrates as by brushing, dipping, spraying, stirring or impregnating. The coating composition, when applied on the substrate, is baked at temperatures between 125° C. and 180° C., thereby curing by loss of the neutralization compound and condensation of free carboxyl and hydroxyl groups. The resulting baked coating is flexible, solvent and weather resistant, and possesses improved gloss, impact-resistance and hardness. The coating composition is especially advantageous over known water-soluble coating compositions in that there is no need for any special curing operation such as air drying prior to baking. In addition, the baking temperature noted above, i.e., 125° C., to 180° C., is no higher than, and in many instances substantially less than, the temperature required to bake conventional alkyd enamels. Moreover, when baked and cured, the surface coating composition of the present invention yields coatings which are harder and more impact-resistant than most other conventional coatings as will be demonstrated hereinafter. Baking time for the coating composition of the invention varies from about 10 minutes to about 80 minutes. Although longer times may be used, some cratering and yellowing of the coating may occur when these longer baking times are used.

The water-soluble polyesteramides of this invention can be prepared in a one-step process which comprises heating a mixture of the above-described polycarboxylic acid component and polyol component at a suitable temperature until a polyesteramide reaction product having an acid number between about 30 and about 100 is obtained. However, such a process is not preferred since it normally produces a reaction product having unacceptable coloration. To avoid such colored products it has been found necessary that the reaction be carried out in two stages if a resin with a lower Gardner color is desired. In the first stage of the reaction, the polycarboxylic acid or anhydride, or a mixture thereof, of the polycarboxylic component is blended with the polyhydric aliphatic or cycloaliphatic alcohol of the polyol component. The blend is heated to a temperature of between about 110° C. and about 260° C., and preferably between 120° C. and 220° C. for a period of from about 0.5 to about 8 hours, preferably from 1 to 3 hours. It is critical that the acid number of this first-stage reaction be maintained between about 50 and about 250, and preferably between about 100 and 250. If the acid number of the first stage is lower than about 50, a hazy resin will be produced whereas an acid number of greater than about 250 will result in a higher Gardner color in the finished resin.

The resulting product from the first reaction stage is cooled to a temperature of between about 80° C. and about 230° C. The trioletheramide portion of the polyol component, along with any additional polycarboxylic acid or anhydride, or mixture thereof, of the polycarboxylic acid component which is to be added is then blended into the first stage product. The resulting mixture is then heated to a temperature of between 110° C. and 260° C., preferably 120° C. to 200° C., for a period of between 1 and 12 hours, preferably between 1 and 5 hours. The final acid number of the finished alkyd resin is critical and must be between about 30 and 100, preferably between 40 and 80.

Although catalysts such as those noted hereinabove may be utilized, it is preferred that the reaction be carried out without catalyst.

The following examples are included to further illustrate the present invention.

EXAMPLE 1

This example demonstrates the two-step reaction process for forming the novel water-soluble alkyd resins of this invention. A five-liter, four-neck, round-bottom flask is fitted with a mechanical stirrer, nitrogen gas purge, thermometer, and Dean-Stark trap which is fitted on a steam-jacketed condenser beneath a water-cooled condenser. The flask is charged with 1332 grams of phthalic anhydride, 564 grams of 2,2-bis(hydroxymethyl) propionic acid and 999 grams of neopentyl glycol. The mixture is heated with stirring to 220° C. and maintained at this level for about one hour. During this time 138 grams of water of reaction evolves. The resulting product, having an acid number of 109, is cooled to 150° C. A charge of 573 grams of the trioletheramide, N,N-bis[2-hydroxyethyl]-2-hydroxyethoxyacetamide, and 876 grams of adipic acid are charged to the flask. The resulting mixture is heated to 160° C. and held at this temperature for about four and one-half hours. During this time, an additional 217 grams of water of reaction is collected. The resulting product is a highly viscous homogeneous liquid having an acid number of 68, a hydroxyl number of 74, a number-average molecular weight of 1869 (determined by ebulliometry) and a Gardner color of 3 (see ASTM D–1544). The polyester resin is cooled to about 80° C. and 250 grams thereof is dissolved in a solution of 28 grams of N,N-dimethylethanolamine in 350 grams of distilled water to give a solution of the polyesteramide having a pH of 7.5. 250 grams of the polyester solution is then added to a blend of 100 grams of titanium dioxide (Du Pont R–960) and 75 grams of distilled water, and milled for 17 hours in a ball mill. Twenty grams of hexamethoxymethylmelamine and 1 gram of 50 percent p-toluenesulfonic acid in n-butanol is then added and the mixture is milled an additional 2 hours. The resulting enamel is thinned with 25 grams of distilled water and 2 grams of a leveling agent sold under the trade name "Surfynol" by Air Products and Chemicals, Inc. and purported to be a blend of an acetylinic glycol with other surface active agents. This gives a coating material having a Ford number 4 cup viscosity of 68 seconds (see ASTM D–1200) and a Hegmann grind of 7.

A film of the coating material is sprayed at a thickness of about 0.0015 inch on a steel plate and then baked without preliminary drying at about 125° C. for about 75 minutes. The resulting baked enamel coating has an impact-resistance of 150/100 (pounds:forward/reverse as tested on a Gardner Light Duty Impact Tester Stock No. IG-1115), a 60° gloss of 95 (see ASTM D-523) and a pencil hardness of 4H.

EXAMPLE 2

This example demonstrates that a mixture of two triols, namely N,N-bis[2 - hydroxyethyl]-2-hydroxyethoxyacetamide, and glycerine, may be used to prepare a polyester which makes a superior surface coating. In this example the identical reaction conditions and reaction apparatus are used as in Example 1. The flask is charged with 532.8 grams of phthalic anhydride, 399.6 grams of neopentyl glycol, and 225.6 grams of 2,2-bis(hydroxymethyl)propionic acid. The mixture is heated to about 210° C. for about one hour. During this time 50 grams of water of reaction evolves. The resulting product has an acid number of 101. 350.4 grams of adipic acid, 114.5 grams of the trioletheramide, and 54 grams of 95 percent glycerine are then added to the resultant product which has been cooled to about 80° C. The mixture is heated to 160° C. for one hour and the temperature then increased to 190° C. for an additional 2 hours. During this time an additional 76 grams of water of reaction evolves. The resulting product is a highly viscous homogeneous liquid having an acid number of 75, hydroxyl number of 91, Gardner color of 2, and number-average molecular weight of 1683. A coating material is prepared as in Example 1 which has a Ford number 4 cup viscosity of 68 seconds and Hegmann grind of 7.

A film of the coating material is sprayed at a thickness of about 0.0015 inch on a steel plate and then baked without preliminary drying at about 125° C. for about 75 minutes. The resulting baked enamel coating has an impact resistance of 130/110 (pounds:forward/reverse), a 60° gloss of 87 and a pencil hardness of 4H.

By way of comparison, the standard General Motors Solvent Bases Lacquer (Du Pont #30 290CPE) has an impact resistance of 10/10 (pounds:forward/reverse), a 60° gloss of 80 and a pencil hardness of 4H. Thus, it is readily apparent that the coating materials formed from the resins made in accordance with this invention are not only water-soluble and can be cured at relatively low temperatures, but also have vastly superior impact resistance and gloss properties over those heretofore commercially available.

The invention has been described in detail with particular reference to preferred embodiments thereof, but it will be understood that variations and modifications can be effected within the spirit and scope of the invention as described hereinabove.

We claim:

1. A curable, water-soluble polyesteramide having an acid number between 30 and 100 and derived from:
   (A) at least one polycarboxylic acid compound having from 4 to 20 carbon atoms selected from the group consisting of aliphatic and aromatic acids, anhydrides, or mixtures thereof, and
   (B) a polyol component comprising
      (a) a trioletheramide compound having the formula

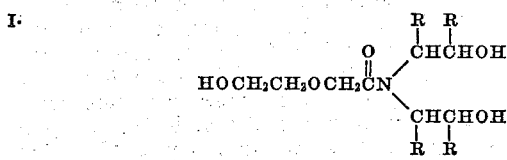

wherein each R is a member selected from the group consisting of hydrogen, methyl and ethyl, the triol component constituting from about 75 to about 30 weight percent of the polyol compound (B), and (b) a diol-acid component consisting of
      (1) a polyhydric aliphatic or cycloaliphatic alcohol having 2 to 10 carbon atoms, and
      (2) a diol-acid compound having the formula

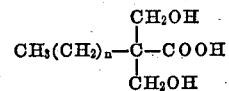

wherein $n$ is a positive integer of 0 to 5, the diol-acid compound (2) constituting about 15 to about 50 weight percent of the diol-acid component (b);
   the ratio of the total hydroxy groups to total carboxyl groups in the reactant components being within the range of about 1.0:1 to about 1.6:1, said components forming integral recurring ester units of the polyesteramide molecular chain through an oxycarbonyl linkage.

2. A polyesteramide according to Claim 1 wherein the polycarboxylic acid compound is selected from aliphatic and aromatic acids or anhydrides having 4 to 12 carbon atoms.

3. A polyesteramide according to Claim 2 wherein said alcohol having 2 to 10 carbon atoms is selected from the group consisting of ethylene glycol, propylene glycol, dipropylene glycol, tripropylene glycol, hexamethylene glycol, diethylene glycol, triethylene glycol, butylene glycol, hexylene glycol, neopentyl glycol, 1,4-cyclohexanedimethanol, hydroxypivalyl hydroxypivalate and 2,2,4-trimethylpentane-1,3-diol.

4. A polyesteramide according to Claim 3 wherein said alcohol is selected from the group consisting of 1,4-cyclohexanedimethanol, propylene glycol or neopentyl glycol.

5. A polyesteramide according to Claim 3 wherein said diol-acid compound is 2,2-bis(hydroxymethyl)propionic acid.

6. A polyesteramide according to Claim 2 wherein said polycarboxylic acid compound is selected from the group consisting of diglycolic acid, maleic acid, succinic acid, glutaric acid, adipic acid, suberic acid, sebacic acid, phthalic acid, isophthalic acid and terephthalic acid.

7. A polyesteramide according to Claim 6 wherein said polycarboxylic acid compound is selected from isophthalic acid and adipic acid.

8. A polyesteramide according to Claim 2 wherein said polycarboxylic acid compounds is an anhydride of diglycolic acid, maleic acid, succinic acid, glutaric acid or phthalic acid.

9. A polyesteramide according to Claim 8 wherein said anhydride is phthalic anhydride.

10. A polyesteramide according to Claim 4 wherein said polycarboxylic acid compound is a mixture of phthalic anhydride and adipic acid.

11. A polyesteramide according to Claim 10 wherein said diol-acid compound is 2,2-bis(hydroxymethyl)propionic acid.

12. A polyesteramide according to Claim 1 wherein said polyhydric alcohol is selected from the group consisting of glycerol, trimethylolethane, and trimethylolpropane.

13. A polyesteramide surface coating composition comprising in admixture about 10 to about 50 weight percent of a polyesteramide according to Claim 2, water and a volatile base.

14. A surface coating according to Claim 13 wherein the volatile base is selected from the group comprising ammonia and N,N-dimethylethanolamine.

15. A surface coating composition according to Claim 13 wherein said composition contains an alcoholic co-solvent for said polyesteramide.

16. A surface coating composition according to Claim 13 which includes a pigment.

17. A process for preparing a curable, water-soluble polyesteramide which comprises:
   (1) heating within a temperature range of from about 110° C. to about 260° C. for a time sufficient to obtain a reaction product having an acid number within the range of about 50 to about 250 a mixture of
(a) at least one polycarboxylic acid compound having 4 to 20 carbon atoms and selected from the group consisting of aliphatic or aromatic acids, anhydrides, or mixtures thereof,
(b) a polyhydric aliphatic or cycloaliphatic alcohol having 2 to 10 carbon atoms, and
(c) a diol-acid compound having the formula:

II.
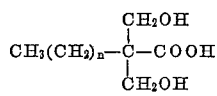

wherein $n$ is a positive integer of 0 to 5, the diol-acid compound constituting about 15 to about 50 weight percent of the total weight of the polyhydric alcohol (b) and diol-acid (c);
(2) cooling said reaction product to a temperature between about 80° C. and about 230° C. and blending therein from about 75 to about 30 weight percent, based on the total weight of polyhydric alcohol (b), diol-acid (c) and the triolamide, of a trioletheramide compound having the formula:

I.
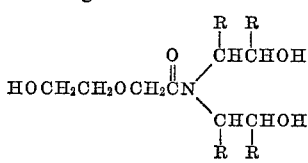

wherein each R is a member selected from the group consisting of hydrogen, methyl and ethyl; and
(3) heating the blend of trioletheramide and reaction product to a temperature of between about 110° C. and about 260° C. for a time sufficient to obtain the polyesteramide having an acid number within the range of about 30 to about 100, the ratio of the hydroxy groups in said trioletheramide and said polyhydric aliphatic or cycloaliphatic alcohol to carboxyl groups in said polycarboxylic acid compound being within the range of about 1.0 to about 1.6.

18. A process according to Claim 17 wherein said polycarboxylic acid compound is selected from aliphatic and aromatic acids or anhydrides having 4 to 12 carbon atoms.

19. A process according to Claim 18 wherein said alcohol having 2 to 10 carbon atoms is selected from the group consisting of ethylene glycol, propylene glycol, dipropylene glycol, tripropylene glycol, hexamethylene glycol, diethylene glycol, triethylene glycol, butylene glycol, hexylene glycol, neopentyl glycol, 1,4-cyclohexanedimethanol, hydroxypivalyl hydroxypivalate and 2,2,4-trimethylpentane-1,3-diol.

20. A process according to Claim 19 wherein said alcohol is selected from the group consisting of 1,4-cyclohexanedimethanol, propylene glycol or neopentyl glycol.

21. A process according to Claim 18 wherein said polycarboxylic acid compound is a dicarboxylic acid selected from the group consisting of diglycolic acid, maleic acid, succinic acid, glutaric acid, adipic acid, suberic acid, sebacic acid, phthalic acid, isophthalic acid and terephthalic acid.

22. A process according to Claim 21 wherein said polycarboxylic acid compound is selected from isophthalic acid and adipic acid.

23. A process according to Claim 18 wherein said polycarboxylic acid compound is an anhydride of diglycolic acid, maleic acid, succinic acid, glutaric acid or phthalic acid.

24. A process according to Claim 23 wherein said anhydride is phthalic anhydride.

25. A process according to Claim 18 wherein said polycarboxylic acid compound is a mixture of phthalic anhydride and adipic acid.

26. A process according to Claim 17 wherein said polyhydric alcohol is selected from the group consisting of glycerol, trimethylolethane and trimethylolpropane.

References Cited
UNITED STATES PATENTS

| 3,436,367 | 4/1969 | McIneracy | 260—40 |
| 3,499,855 | 3/1970 | Roper | 260—22 |
| 3,549,577 | 12/1970 | Stromberg | 260—29.4 |
| 3,652,501 | 3/1972 | Albers et al. | 260—75 N |
| 3,686,360 | 8/1972 | Cunningham | 260—850 |

FOREIGN PATENTS 1,048,893  11/1966  Great Britain.

OTHER REFERENCES

Yeagle: *J. Paint Technol.*, 42, 472–82 (1970).

MELVIN GOLDSTEIN, Primary Examiner

U.S. Cl. X.R.

117—132 B; 260—75 N